US008689299B2

(12) United States Patent
McBride et al.

(10) Patent No.: US 8,689,299 B2
(45) Date of Patent: Apr. 1, 2014

(54) SYSTEM AND METHOD FOR ACCESSING A SOFTWARE APPLICATION

(75) Inventors: Brian Everett McBride, Carp (CA); Avinash Chidambaram, Mississauga (CA); Jérôme Bertrand Nicolas Cornet, Ottawa (CA)

(73) Assignee: BlackBerry Limited, Waterloo (CA)

( * ) Notice: Subject to any disclaimer, the term of this patent is extended or adjusted under 35 U.S.C. 154(b) by 147 days.

(21) Appl. No.: 13/334,890

(22) Filed: Dec. 22, 2011

(65) Prior Publication Data

US 2013/0167209 A1   Jun. 27, 2013

(51) Int. Cl.
*G06F 21/00* (2013.01)

(52) U.S. Cl.
USPC ............ 726/6; 726/4; 726/5; 726/8; 713/171; 713/182; 380/270

(58) Field of Classification Search
USPC .......................................................... 726/6
See application file for complete search history.

(56) References Cited

U.S. PATENT DOCUMENTS

| 5,872,915 | A * | 2/1999 | Dykes et al. ........................ 726/5 |
| 7,941,831 | B2 | 5/2011 | Mandhana et al. |
| 2002/0144119 | A1* | 10/2002 | Benantar ....................... 713/171 |
| 2003/0120667 | A1* | 6/2003 | Jeong et al. .................... 707/100 |
| 2003/0182581 | A1* | 9/2003 | Isozaki .......................... 713/201 |
| 2006/0101507 | A1* | 5/2006 | Camenisch ....................... 726/5 |
| 2007/0040021 | A1* | 2/2007 | Nakayma ....................... 235/380 |
| 2008/0022364 | A1* | 1/2008 | Oikawa et al. .................... 726/2 |
| 2008/0168533 | A1 | 7/2008 | Ozaki et al. |
| 2009/0113527 | A1* | 4/2009 | Naaman et al. .................. 726/5 |
| 2009/0271637 | A1 | 10/2009 | Takekawa et al. |
| 2009/0327739 | A1* | 12/2009 | Relyea et al. ................. 713/182 |
| 2010/0154041 | A1* | 6/2010 | Dalzell et al. .................... 726/6 |
| 2011/0055841 | A1* | 3/2011 | Senno et al. .................. 718/103 |
| 2011/0289567 | A1* | 11/2011 | Bauer-Hermann et al. ....... 726/6 |
| 2012/0173654 | A1* | 7/2012 | Tsao et al. .................... 709/213 |

FOREIGN PATENT DOCUMENTS

WO   WO2005106675 A1   11/2005

OTHER PUBLICATIONS

Widera, Sabine; Search Report from corresponding European Application No. 11195170; search completed Aug. 23, 2012.

* cited by examiner

*Primary Examiner* — William Powers
*Assistant Examiner* — Yonas Bayou
(74) *Attorney, Agent, or Firm* — Wilfred P. So; Blake, Cassels & Graydon LLP

(57) ABSTRACT

Systems and methods for managing a user identity on a mobile device are provided. The system comprises the mobile device comprising a user agent and a client application, the user agent and the client application in communication with each other. The system further comprises an identity provider in communication with the mobile device, and a client service in communication with the mobile device. The user agent is configured to communicate with the identity provider and retrieve the user identity for the client application, and the client application is configured to transmit the user identity to the client service.

18 Claims, 12 Drawing Sheets

Create Application Access Credentials — 404

USER NAME — 406

Do you want to create a password or use an auto-generated password?

Create my own password — 408 (A - Select)

Use auto-generated password — 410 (B - Select)

Enter password: — 414

Remember your password.

Your auto-generated password has been created and stored. No need to remember the password! — 418

FIG. 10(c)

SYSTEM AND METHOD FOR ACCESSING A SOFTWARE APPLICATION

TECHNICAL FIELD

The following relates to systems and methods for accessing a software application.

BACKGROUND

A mobile device can be used for running various types of software applications. Examples of software applications include social networking applications, communication applications, advertising applications and banking applications. Several client applications may be loaded onto a mobile device, which makes the mobile device a resourceful tool.

To access an application, a user may provide credential information to the application, for example, a username and a password. If there are many applications, the user may need to remember the credential information for each application and provide the credential information to each application.

BRIEF DESCRIPTION OF THE DRAWINGS

Embodiments will now be described by way of example only with reference to the appended drawings wherein:

FIG. 9 is an example graphical user interface (GUI) for a single sign-on.

FIG. 10(a) is an example GUI for creating credentials for accessing an application.

FIG. 10(b) is an example GUI to allow a user to enter in a password.

FIG. 10(c) is an example GUI displaying a message that a password has been automatically generated and stored.

DETAILED DESCRIPTION OF THE DRAWINGS

Computing devices are used to operate many different types of applications, also called software programs. The terms "application", "software application", "software program", and "program" are interchangeably used herein. Many applications require a user to sign-in, register, or log-in to an account. Typically, a user identification (e.g. a user name) and a password are used to verify that the correct user is logging into a particular account. If there are more applications that are used on a mobile device, then a user is required to remember more user identifications and passwords. This can be troublesome. Further, if a user would like to use multiple applications upon turning on the device, then the user typically needs to manually-enter in a user identification and a password for each of the applications. This is a time consuming process.

The management of user identifications and passwords becomes more cumbersome when a user owns multiple mobile devices which may operate common applications. When using multiple mobile devices, the user may need to sign-on to the same application on each mobile device. Thus, the user needs to sign-on multiple times. This process is also time consuming and inconvenient.

In addition, user identity information (also referred herein as user profile data) is often used to register a new user onto an application account, or to sign a user into an application having an existing account. The user identity information may be personal information and a user may not wish to have the personal information provided to entities that are not trusted. The user identity information can, for example, potentially be used to commit identity fraud. When a user repetitively provides this personal information, it is possible that an adversary person or program has an increased chance to obtain the user identity information.

Figure 1:
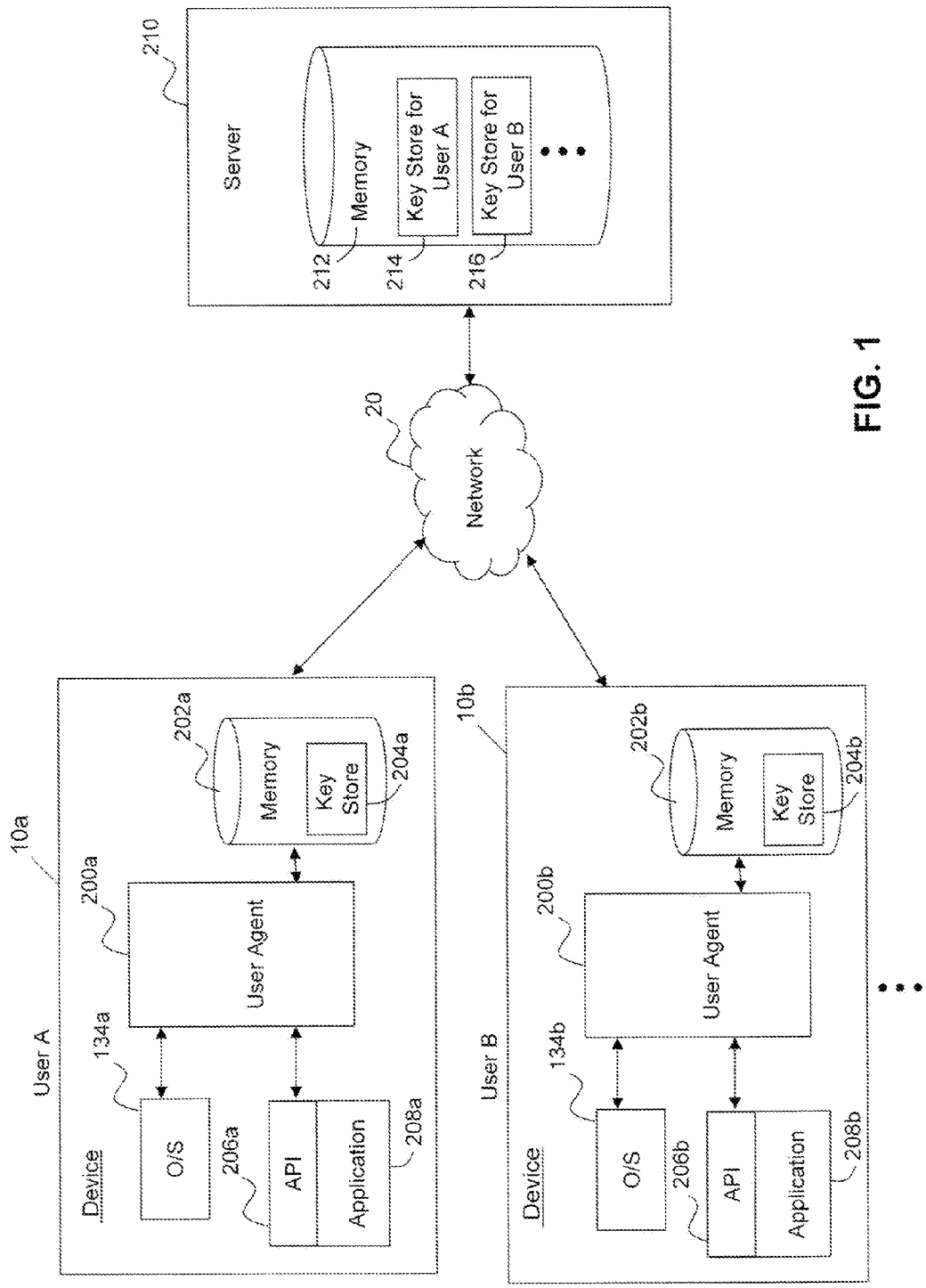
FIG. 1 is a block diagram illustrating one or more computing devices in communication with a server.

To address one or more of the above issues, turning to FIG. 1, the proposed systems and methods provide a computing device 10a and another computing device 10b both in communication with a server 210 through a network 20. The device 10a may belong to User A, and the other device 10b may belong to User B. There may be other computing devices that are in communication with the server 210.

As the devices 10a and 10b may have similar software and hardware components, for clarity, some of the components are referred with the same reference numeral having a suffix 'a' for those components in device 10a, or a suffix 'b' for those components in device 10b.

Referring to software components on the device 10a, a user agent 200a is in communication with an operating system 134a, an application 208a, and a memory module 202a for storing keys and credentials. The user agent 200a communicates with the application 208a through an application programming interface (API) 206a. It can be appreciated that although one application is shown on the device 10a in FIG. 1, there may be many applications, each able to communicate with the user agent 200a through an API.

The user agent 200a manages the storage and retrieval of credential information used to access the one or more applications on the device 10a. The credential information of the one or more applications is stored in a key store 204a in the memory module 202a. The user agent 200a is authorized to retrieve the key store 204a and to retrieve the credential information from the key store 204a. The user agent 200a provides the retrieved credential information to the corresponding application through the API, and the application uses the credential information to allow a user to automatically access or sign into the application. For example, the user agent 200a retrieves the credential information to access the application 208a from the key store 204a. The user agent 200a then provides this information to the application 208a through the API 206a.

The user agent 200a is activated through the operating system 134a. After a user has signed into the operating system 134a, the user agent 200a is activated. In another example embodiment, after signing into the operating system 134a, the user further signs into the user agent 200a to activate the user agent 200a. A user, for example, signs into the operating system 134a or the user agent 200a by entering a password or a username, or both. This may, for example, be considered to be the "single sign-on". After the user agent 200a is activated, it is able to retrieve and store credentials in the key store 204a.

It can be appreciated that the one or more applications, for example, application 208a, may include third party applications and may pose a security risk. For example, an application may access personal information or credential information corresponding to another application on the computing device 10a, without the user's consent or knowledge. To address this risk, the credential information, which is used to access the one or more applications, is centrally stored in the key store 204a. The user agent 200a is able to store and retrieve the credential information in the key store 204a for each of the one or more applications.

Similar components exist in the other device 10b. Particularly, the user agent 200b communicates with an operating system 134b, an application 208b, and a memory module 202b which stores the key store 204b. The user agent 200b interacts with the application 208b through an API 206b.

A copy of the key store 204a for User A and a copy of the key store 204b for User B are stored in a memory module 212 on the server 210. In particular, the key store for User A 214 on the server 210 is identical or similar to the key store 204a. Similarly, the key store for User B 216 on the server 210 is identical or similar to the key store 204b.

It is recognized that a single user may have multiple devices and the user may update the credentials for an application on one device. The system described herein stores the updated credentials on the server 210 as well, and propagates the updated credentials to other devices belonging to the same user. Therefore, when the user accesses the same application on a different device, the updated credentials can be used to log into or access the same application.

It can be appreciated that the systems and methods described herein allow for a single sign-on process into multiple applications while providing security of the credential information.

Figure 2B:
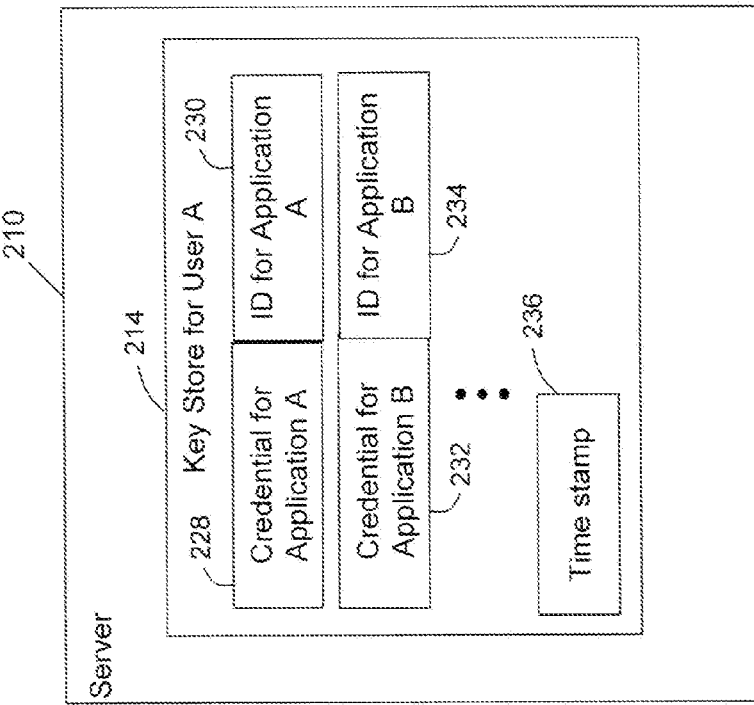
FIG. 2(b) is a schematic diagram illustrating example components in a key store on a server.
Figure 2A:
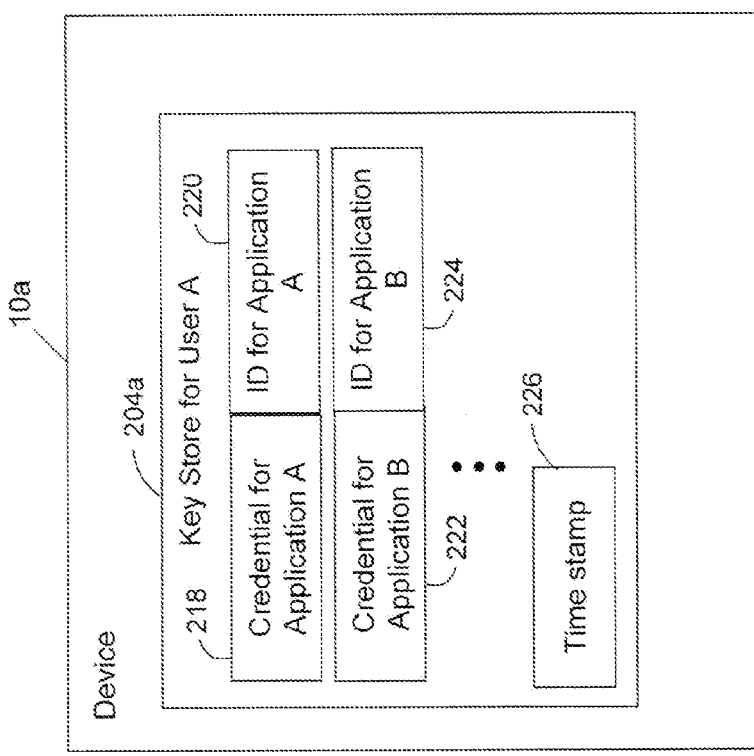
FIG. 2(a) is a block diagram illustrating example components in a key store on a computing device.

Turning to FIG. 2(a), example components are shown in the key store 204a on the device 10a for a certain user (e.g. User A). Each application is associated with an application identification (ID) and credential information for accessing the application. This information for the certain user is stored on the key store 204a as well as on the key store 214 on the server 210.

For example, on the key store 204a, there is stored an ID for application A 220 and a corresponding credential for application A 218. There is also stored an ID for application B 224 and a corresponding credential for application B 222. There is also a time stamp 226 indicating when the key store 204a, or information therein, was last updated.

Referring to FIG. 2(b), similar example components are shown in the key store 214 on the server 210. There is stored an ID for application A 228 and a corresponding credential for application A 230. These may correspond to the components 220 and 218, respectively. There is also stored an ID for application B 234 and a corresponding credential for application B 232. These may correspond to the components 234 and 232, respectively. There is also a time stamp 236 indicating when the key store 214, or information therein, was last updated.

It can be appreciated that the data or components stored in the key store 204a and key store 214, may be identical or may be different. If the data between the device 10a and the server 210 have been synchronized, the data in the key stores 204a and 214 may be identical. However, if the data on the device 10a is updated first before the data on the server 210, or if the data on the server 210 is updated before the data on the device 10a, then the data in the key stores 204a and 214 may be different.

A time stamp is used to indicate which key store is most up to date. The time stamp may also indicate that a key store (e.g. on a device 10a or on a server 210) is not the most recently updated copy of the key store. It can also be appreciated that the time stamp 226 may be different or identical to the time stamp 236.

In another example embodiment, another indicator, not necessarily a time stamp, can be used to indicate which copy of the key store is most up to date. The indicator, for example, can be a Boolean value or a flag.

It can be appreciated that the credential information used to access an application may be in various formats and may include different types of data. Non-limiting examples of such credential information include: a password, a username, a cryptographic key, an identification value, a serial number, a PIN number, and a value related to the device or to the user.

In an example embodiment, the key stores (e.g. 204a, 204b, 214, 216) are encrypted. This helps to prevent credential information from being accessed by an attacker. For example, when retrieving and storing credential information in a key store, the key store is decrypted to access the credential information and then encrypted again. In an example embodiment, the indicator or time stamp is not encrypted in the key store. This, for example, allows a user agent to determine whether the key store is up to date without having to decrypt the key store. In another example embodiment, the indicator or time stamp is encrypted with the key store. This, for example, prevents an attacker from possibly determining whether an encrypted key store is most up to date.

Figure 3:
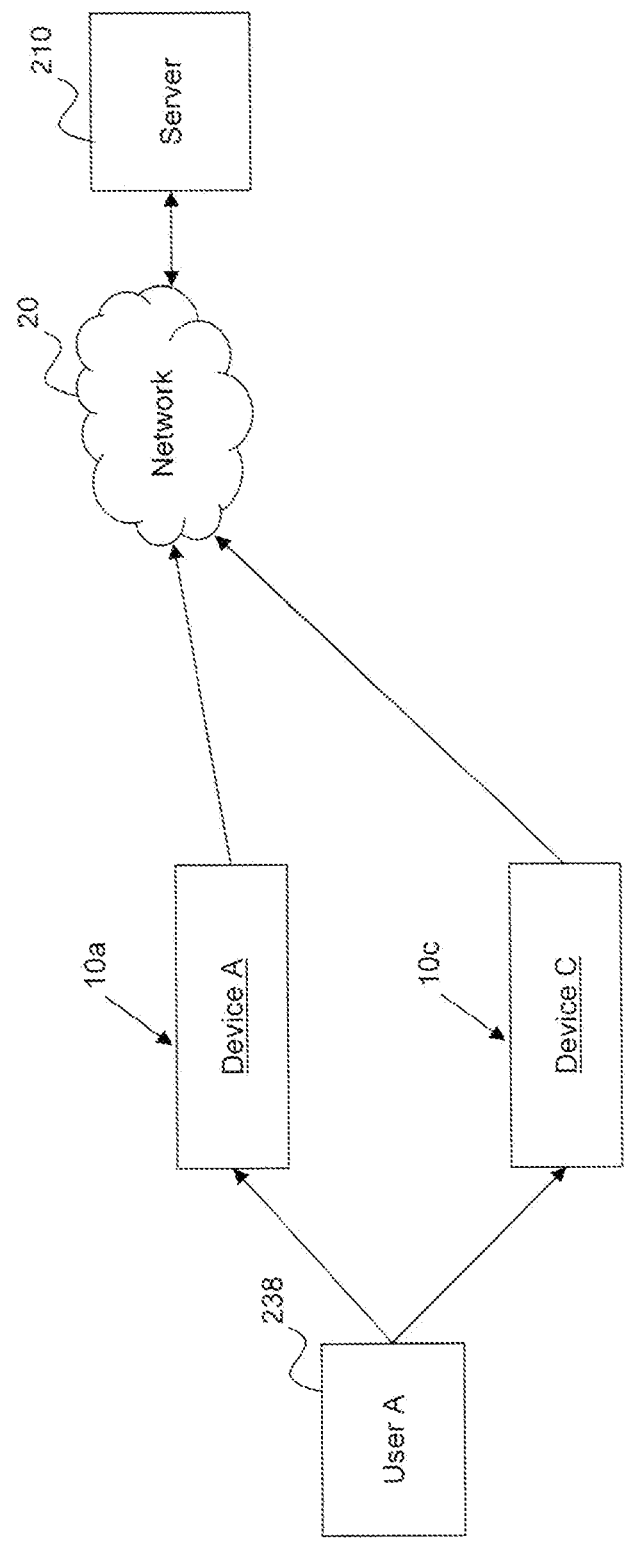
FIG. 3 is a block diagram illustrating a user associated with two computing devices, each of which being in communication with the server.

Turning to FIG. 3, an example configuration shows a user owning or having access to multiple devices. For example, User A 238 is shown to be owning or having access to devices 10a and 10c. Both of the devices 10a and 10c are in communication with the server 210 through the network 210. It can be appreciated that each of User A's devices (e.g. devices 10a and 10c) and the server 210 have a copy of the key store for User A.

The following examples include communications between mobile or handheld devices, which will be commonly interchangeably referred to as a computing device, mobile device, or device hereinafter and referred to by numeral 10.

The mobile device 10 can be a multi-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a multi-way pager, a cellular telephone with data messaging capabilities, a wireless Internet appliance, a tablet, a media player, an e-book reader, a laptop, a notebook, a gaming device, a navigation device, a personal computer, or a data communication device (with or without telephony capabilities). These are non-exhaustive examples, and other examples are within the scope of the present disclosure. The mobile device 10 can also be one that is used in a system that is configured for continuously routing all forms of pushed information from a host system 25 to the mobile device 10. One example of such a system will now be described making reference to FIG. 4.

Figure 4:
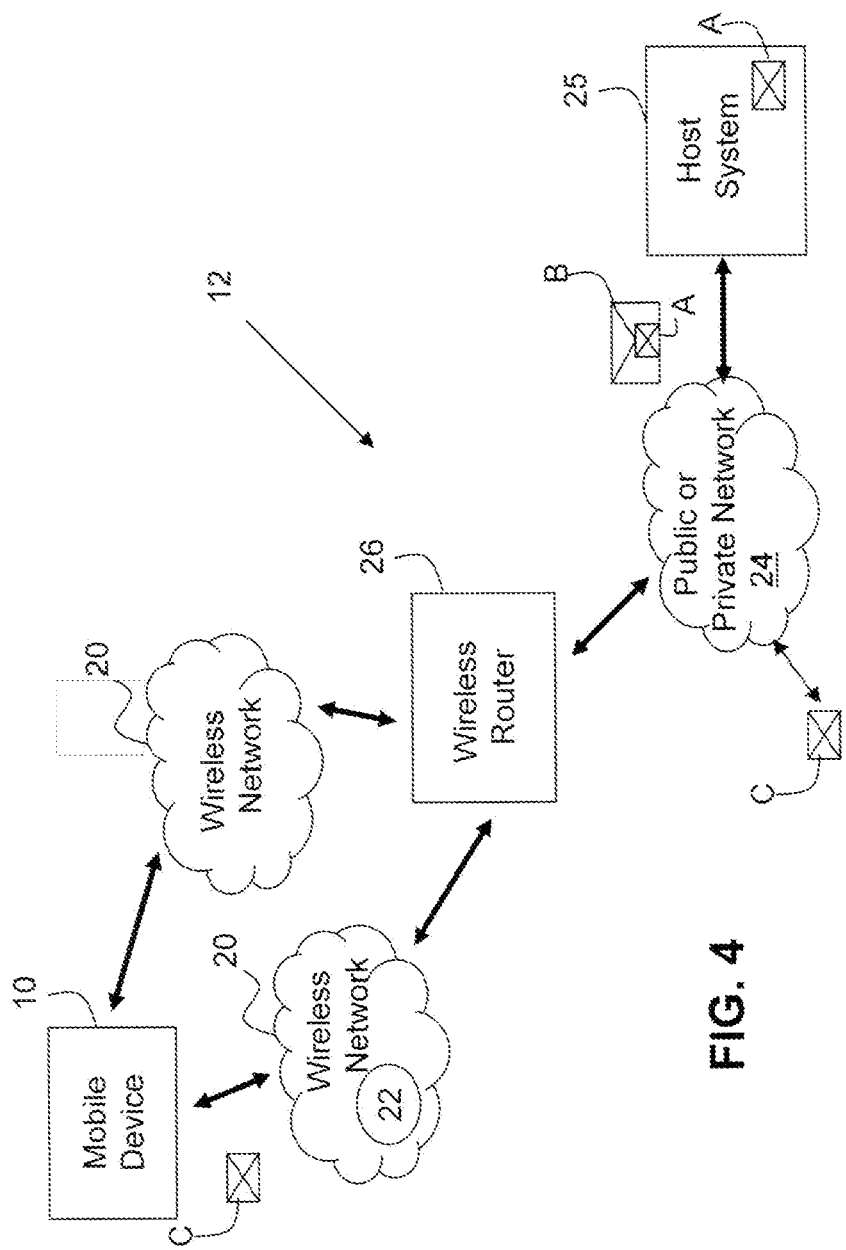
FIG. 4 is a schematic diagram illustrating a system in which data items are pushed from a host system to a mobile device.

FIG. 4 is an example system diagram showing the redirection of user data items (such as message A or C) from an intermediary computer system (host system) 25 to the user's mobile device 10 via a wireless router 26. The wireless router 26 provides the wireless connectivity functionality as it acts to both make transparent most of the wireless network's 20 complexities, and it also implements features to support pushing data to the mobile device 10. Although not shown, a plurality of mobile devices may access data from the host system 25. In this example, message A in FIG. 4 represents an internal message sent from, e.g. a desktop computer (not shown) within the host system 25, to any number of server computers in the network (e.g. LAN), which may, in general, include a database server, an event server, an E-mail server or a voice-mail server.

Message C in FIG. 4 represents an external message from a sender that is not directly connected to the host system 25, such as the user's mobile device 10, some other user's mobile device (not shown), or any user connected to the public or private network 24 (e.g. the Internet). Message C may include e-mail, voice-mail, event information, database updates, web-page updates or may represent a command message from the user's mobile device 10 to the host system 25. The host system 25 may comprise, along with the typical communication links, hardware and software associated with a computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a network firewall.

The mobile device 10 may be adapted for communication within wireless network 20 via wireless links, as required by each wireless network 20 being used. As an illustrative example of the operation for a wireless router 26 shown in FIG. 4, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless routers 26 firewall protecting the wireless router 26 (not shown).

Although the above describes the host system 25 as being used within a networked environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 3) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a multiway communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise a Code Division Multiple Access (CDMA) network. These networks may also include a Groupe Special Mobile or the Global System for Mobile Communications (GSM) and General Packet Radio Service (GPRS) networks. These networks may also include existing and upcoming third-generation (3G) and fourth generation (4G) networks like EDGE, UMTS and HSDPA, LTE, Wi-Max etc. Some older examples of data-centric networks include, but are not limited to: the Mobitex Radio Network ("Mobitex") and the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: An addressing method so that mobile device 10 traffic can be addressed to a host system 25 without the need for the wireless network 20 to assign an identity to each host system 25; An efficient and authenticated method for the host system 25 to initiate a communication connection to the wireless router 26 for the purposes of opening a communication tunnel to the one or more mobile devices 10 that the host system 25 wishes to communicate with; A reliable method for exchanging data between the host system 25 and the mobile device 10, in a manner consistent with the abilities of the wireless network 20; Providing feedback to the host system 25 when data is delivered, which allows the host system to clean up any wireless delivery queues if necessary, or inform the original sender (user or program) that the data has been delivered to the mobile device 10; Implementation of a wireless network 20 initiated push of services or data to a mobile device 10, from a wireless router 26; and Connect to a wide range of wireless networks 20 and provide a way of tracking the user's location so that a 'follow you anywhere' solution can be provided.

Figure 5:
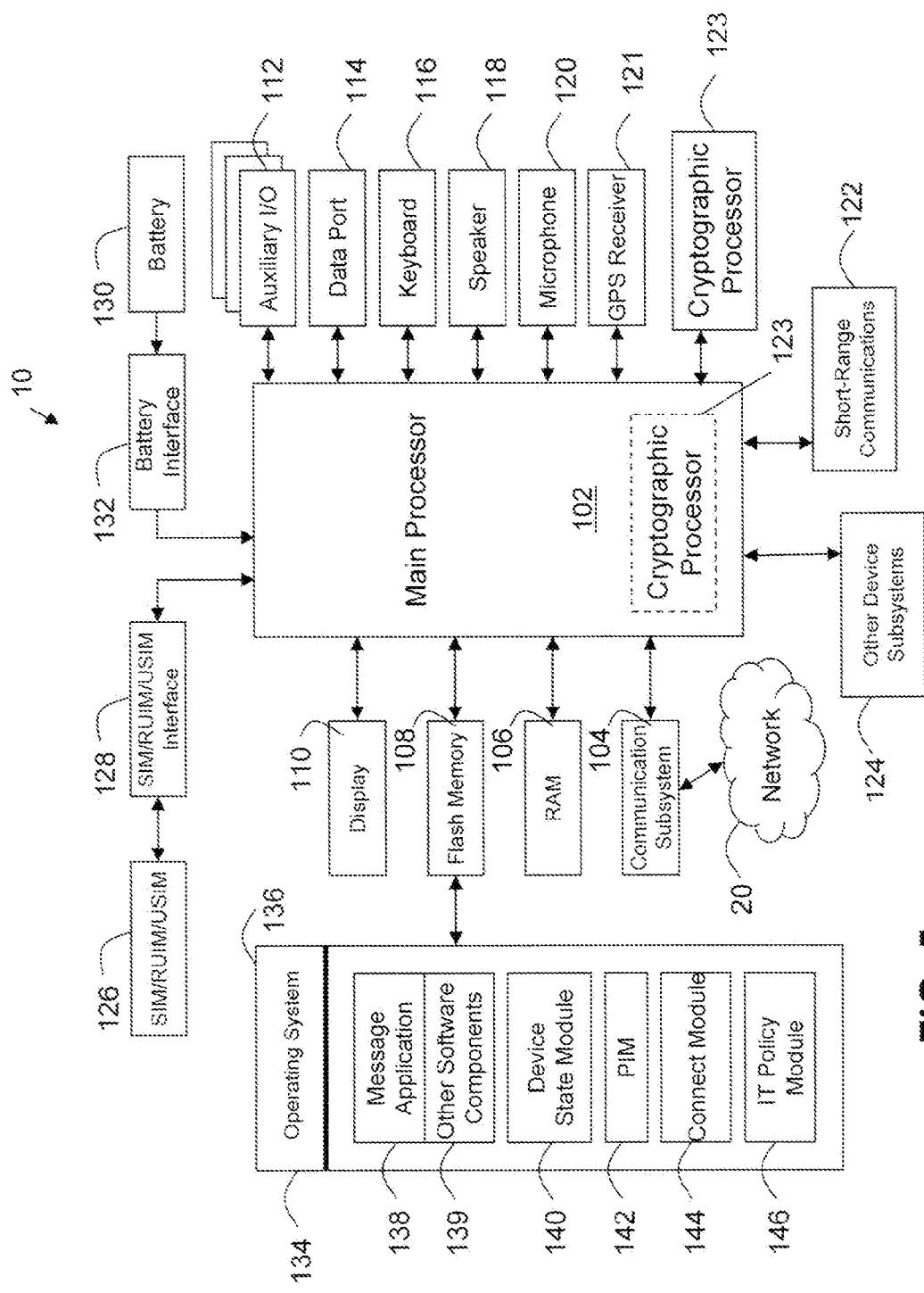
FIG. 5 is a block diagram of an example embodiment of a mobile device.
Figure 6:
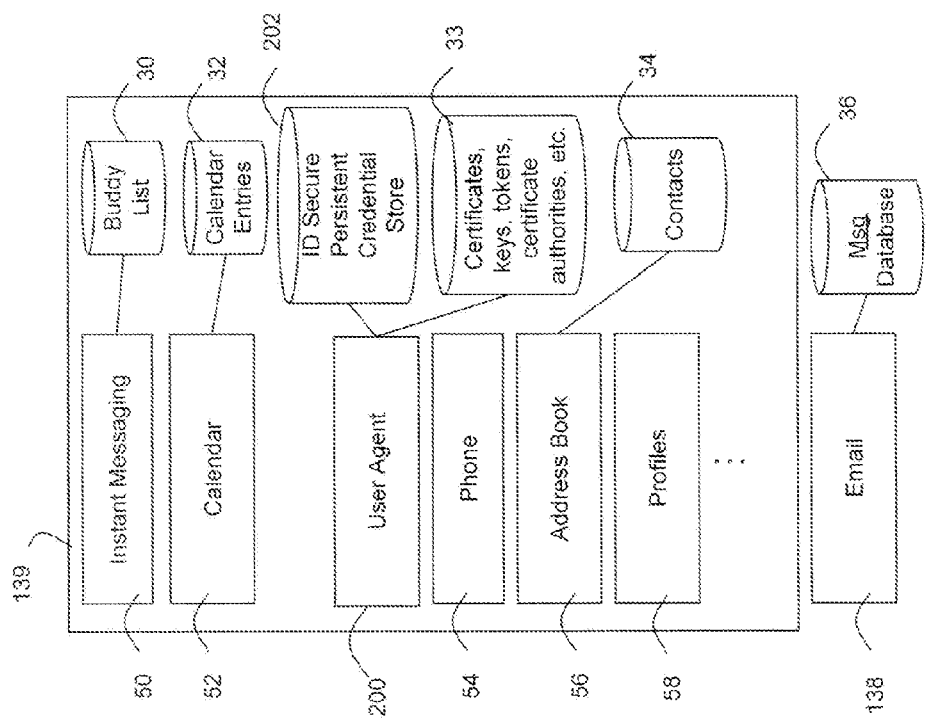
FIG. 6 is a block diagram illustrating example ones of the other software applications and components shown in FIG. 5.

An example configuration for the mobile device 10 is illustrated in FIGS. 5 and 6. Referring first to FIG. 5, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed.

Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

In the examples described herein, the mobile device 10 comprises or otherwise has access to a cryptographic processor 123 which can be embodied in hardware, software, or a combination of the two. The cryptographic processor 123 may interact with a user agent 200 to perform cryptographic operations. The mobile device 10 may also comprise internal or external memory or other computer readable media for storing computer executable instructions for enabling the cryptographic processor 123 to perform cryptographic operations as is known in the art. As can be seen in FIG. 5, the cryptographic processor 123 may be independent of the main processor 102 in a mobile device configuration, or may be implemented by special instructions or hardware associated with the main processor 102 itself.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and controlling data items of interest to the user, such as, but not limited to, e-mail, text messages, instant messages, contacts, events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 6 shows an example of the other software applications and components 139 that may be stored on and used with the mobile device 10. Only examples are shown in FIG. 6 and such examples are not to be considered exhaustive. In this example, an instant messaging application 50, calendar application 52 (or other event related organizer), a user agent 53, phone application 54, address book 56 and a profiles application 58 are shown to illustrate the various features that may be provided by the mobile device 10. Also shown in FIG. 6 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The instant messaging application 50 is an instant messaging service that may be hosted and provided by the host system 25, e.g. using a messaging server at the wireless router 26 or may be associated with a $3^{rd}$ party instant messaging service (not shown). The instant messaging application 50 comprises or otherwise has access to contact information often referred to as a "buddy" list 30. The calendar application 52 comprises or otherwise has access to a portion of memory, database or other data storage device storing calendar entries 32, which may include any data or information associated with a particular date and time in the calendar application 52 and may be displayed in a graphical user interface (GUI) therefor. It can be appreciated that such software applications and components 139 may require one or more operational certificates 33 to operate or function on the mobile device 10.

Continuing with FIG. 6, the user agent 200 comprises or otherwise has access to a portion of memory, database or other data storage device for cryptographic data 33, which may include any data or information associated with cryptographic functions. In particular, the stored data 33 includes, for example, certificates, tokens, public and private keys, and a listing of certificate authorities.

The user agent 200 also has access to the memory module 202, which may be an ID secure persistent credential storage. This data includes credential information that may be highly sensitive. For example, in a mobile banking application, the credentials stored may include the verification code and PIN number. In government related client applications, the credentials stored may include a person's social security number or social insurance number. The key store (e.g. key store 204*a*) is also stored in the memory module 202.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device 10, server 210, etc., or accessible or connectable thereto. Any application or module herein described may be implemented using computer readable/executable instructions that may be stored or otherwise held by such computer readable media.

A number of figures are discussed below with respect to the method of establishing and managing the personal identity information.

Figure 7A:
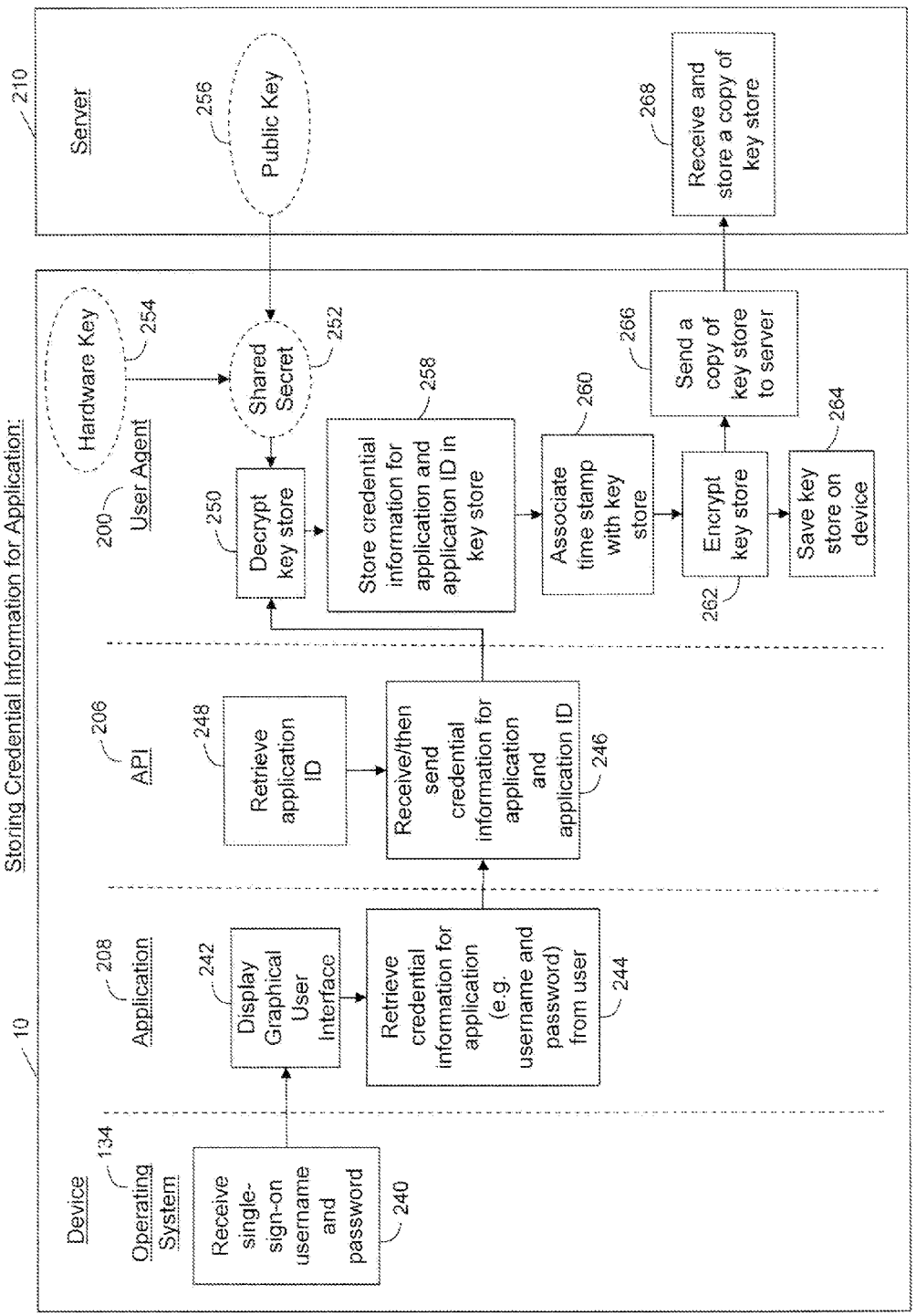
FIG. 7(a) is a flow diagram illustrating example computer executable instructions for storing credential information for an application.
Figure 7B:
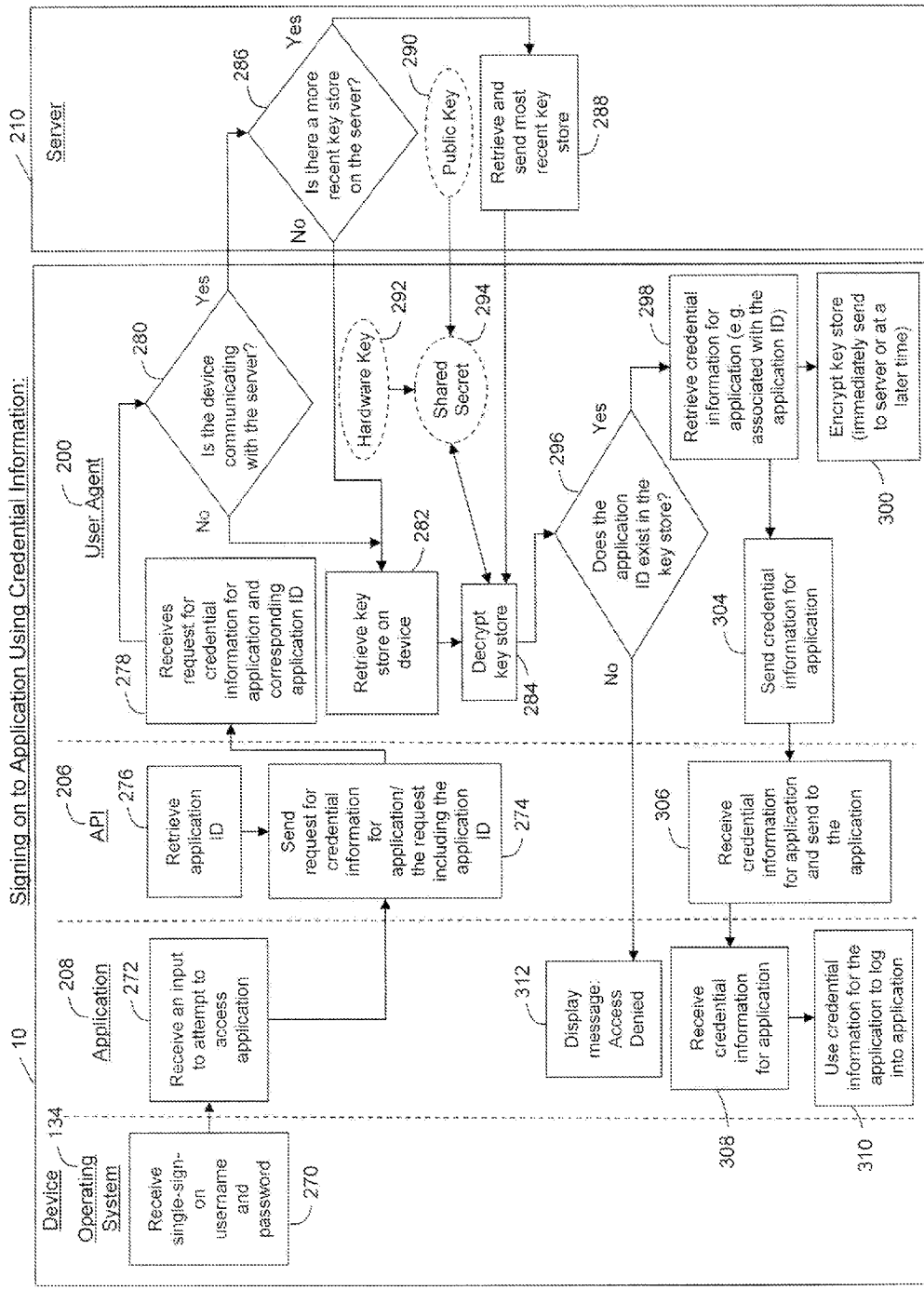
FIG. 7(b) is a flow diagram illustrating example computer executable instructions for accessing the application using the credential information.

Turning now to FIG. 7(*a*), example computer executable instructions are shown for storing credential information for an application. The operating system 134, at block 240, receives a single sign-on username and password. This information is used to access or log into the operating system. This information may also be used to activate the user agent 200. After receiving and successfully authenticating the username and password, the application 208, at block 242, displays a GUI for retrieving credential information (e.g. username and password) from the user. After retrieving this credential information (block 244), this information is sent to the API 208.

The API 208, at block 248, retrieves the application ID corresponding to the application. After obtaining the application ID and the credential information, the API 208 sends this information to the user agent 200 (block 246). The user agent 250 decrypts the encrypted key store 204 (block 250). It can be appreciated that the key store 204 is stored on the device in an encrypted state.

In an example embodiment, the key store 204 can be encrypted and decrypted using a shared secret 252. The shared secret 252 can be derived from a hardware key 254 stored on the device 10 and from a public key 256 of the server 210. The key 254 is associated with the hardware of the device 10.

Continuing with FIG. 7(*a*), after decrypting the key store 204, the user agent 200 stores credential information for the application, as well as the corresponding application ID, in the key store 204 (block 258). The user agent 200 associates a time stamp with the key store to indicate when the key store 204 was updated (e.g. the time stamp indicates when the credential information and application ID were stored on the key store) (block 260). At block 262, the user agent 200 encrypts the key store 204 and saves the encrypted key store on the device 10 (block 264). By re-encrypting the key store 204, the key store 204 remains secure when not in use. At block 266, the user agent 200 sends a copy of the encrypted key store to the server 210.

At block 268, the server 210 receives and stores a copy of the key store. In this way, the server 210 has the most recent copy of the key store and can distribute the most recent copy to other computing devices belonging to the same user.

Turning to FIG. 7(*b*), example computer executable instructions are provided for signing on to an application or accessing an application using credential information. This process can be performed by the device 10 for each of the multiple applications stored thereon. In this way, the user is automatically logged onto multiple applications using a single sign-on username and password.

At block 270, the operating system receives a single sign-on username and password. At block 272, the application 208 receives an input to attempt to access the application. After receiving the input, the API 206 performs the operation of block 274. An input, for example, can be user tapping on an icon of the application.

It can be appreciated that by waiting for the input at block 272, only those applications that a user has a desire to access (e.g. as indicated by the input) will undergo or trigger the operations in FIG. 7(*b*). In other words, computing resources are not automatically consumed to retrieve credential information if a user has not indicated a desire to access the application. Furthermore, the credential information and key store are not automatically decrypted, which reduces the security risk to exposing the credential information. However, in another example embodiment, the process proceeds from block 270 to block 274 without waiting for the receipt of the input at block 272. This can expedite the process.

At block 276, the API 206 retrieves the application ID. After obtaining the application ID and after the operating system 134 has received the username and password, the API 206 sends the request for credential information for the application (block 274). The request may include the application ID. At block 278, the user agent 200 receives the request for credential information for the application, as well as the corresponding application ID. At block 280, the user agent 200 determines if the device 10 is communicating with the server 210.

If the device 10 is in communication with the server 210, at block 286, the user agent 210 communicates with the server 210 to determine if there is a more recent key store on the server 210. If not, the user agent 200 retrieves the key store that is stored on the device 10 (block 282). If there is a more recent key store on the server 210, then the server 210 retrieves the more recent key store and sends it to the user agent 200 (block 288). It can be appreciated that the determination of which key store (e.g. on the device 10 or on the server 210) is more recent is based on an indicator associated with each of the key stores. The indicator, for example, can be a time stamp.

It can be appreciated the retrieved key store 284 is encrypted. Therefore, after retrieving the key store, either from the memory module on the device 10 or from the server 210, the user agent 200 decrypts the key store (284). The encrypted key store 284 can be decrypted using a shared secret 294. The user agent 200, for example, can compute the shared secret using the hardware key 292 stored on the device 10 and the public key 290 of the server 210.

It can be, appreciated that, at times, the device 10 is not in communication with the server 210. For example, the device 10 may be in a location which does not have access to the network 20. For example, in an underground building or in remote areas, the device 10 may not have wireless access to the network 20. There may also be situations in which the device's radio communications are turned off. Example situations include when the user is in a hospital and when the user is on an airplane.

It is recognized that, although the device 10 is not in communication with the server 210, it is desirable for the device 10 to automatically retrieve the credential information to access the application. Therefore, if, from block 280, the device is not in communication with the server 210, the user agent 200 retrieves the key store currently stored on the device 10. The process continues to block 284 to decrypt the key store.

After decrypting the key store 284, the user agent 200 determines whether or not the application ID exists in the key store (block 296). If the application ID for the application does not exist, then the application 208 displays a message that access is denied (block 312). In other words, the application credentials are not present on the key store and the request therefore cannot be complied with.

If the application ID is present in the key store, at block 298, the user agent 200 retrieves the credential information for the application, which is associated with the application ID. At block 300, the user agent 200 encrypts the decrypted key store. In an example embodiment, the key store is encrypted immediately after retrieving the credential information. In another example embodiment, the key store is encrypted some time later after the operation of block 298.

At block 404, the user agent 200 sends the credential information to the application. The credential information is received by the API 206 and passed to the application 208 (block 306). The application 208 receives the credential information (block 308) and uses the credential information to sign into or access the application.

Figure 8A:
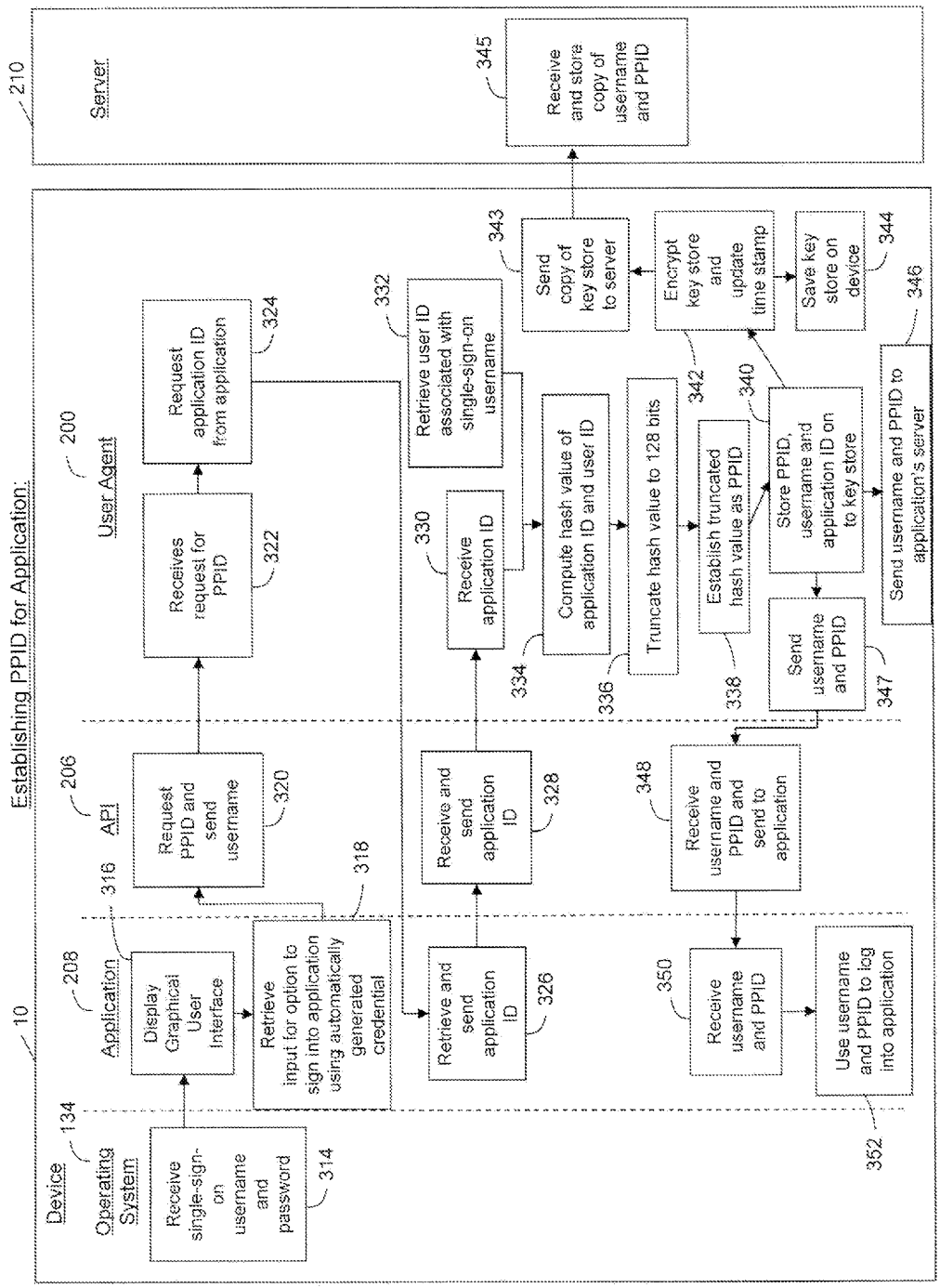
FIG. 8(a) is a flow diagram illustrating example computer executable instructions for generating and storing credential information for an application.
Figure 8B:
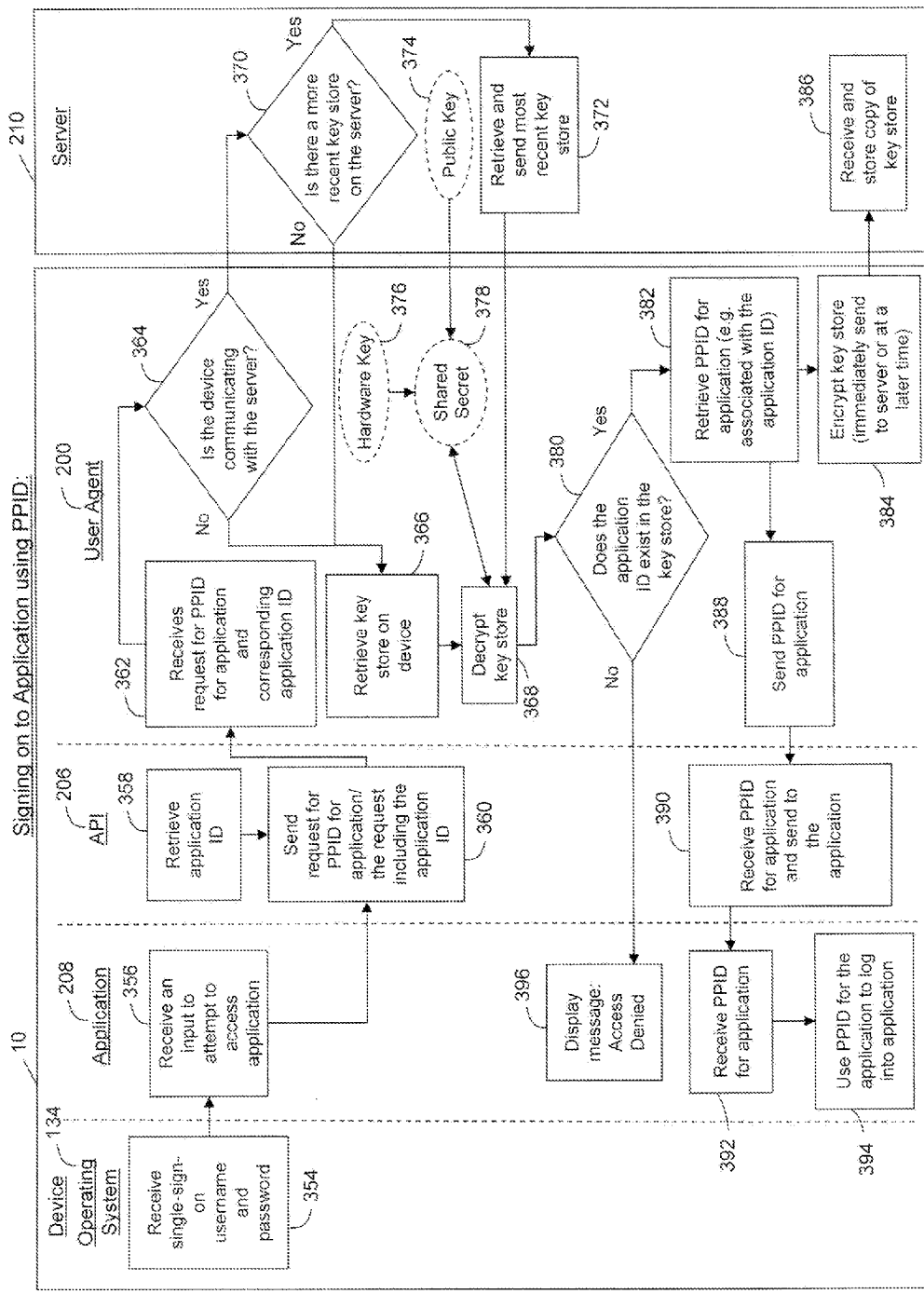
FIG. 8(b) is a flow diagram illustrating example computer executable instructions for accessing the application using the credential information.

Turning to FIG. 8(*a*), example computer executable instructions are provided for generating a credential value, herein referred to as a personal private identifier (PPID). The PPID is used by the user agent 200 to determine identifying information of the user. The PPID is also used by the application 208 as a credential to access the application. However, the identifying information of the user cannot be determined by the application 208.

At block 314, the operating system 134 receives a username and password. This, for example, is used to activate the single sign-on feature provided by the user agent 200. In this scenario, it is assumed that the user does not have a PPID associated with the application 208.

At block 316, the application 208 displays a GUI which may show an option for a user to sign into the application using a username and password (e.g. the password created by the user). If this option is selected, the operations shown in FIG. 7(*a*) would be performed. The GUI may also show another option to sign into the application using an automatically generated credential. If the application 208 detects that this other option has been selected (block 318), then the API 206 sends a request to the user agent to provide a PPID (block 320). Additionally, the username of the user may be sent with the request to the user agent 206. At block 322, the user agent 200 receives the request for the PPID and, at block 324, requests the application ID from the application. The application 208 or the API 206 sends the application ID to the user agent 200 (blocks 326 and 328). The user agent 200 receives the application ID (block 330).

The user agent also retrieves a user ID associated with the single sign-on username (block 322). The user ID is an identification that remains with the user across all devices belonging to the user. The user ID also does not change. For example, although the user may change the single sign-on username or the single sign-on password, the user ID does not change. The user ID can be, for example, a number.

The user agent 200 computes the hash value of the application ID and the user ID (block 334). The hash value may then be truncated to a certain bit value, for example, 128 bits (block 336). The truncated hash value is established as the PPID (block 338). At block 340, the PPID and the application ID are stored in association with one another on the key store. It can be appreciated that the key store may have been encrypted, and may be decrypted first to access and store information on the key store. Furthermore, it can be appreciated that, if it is detected that the device 10 is in communication with the server 210, then the device 10 and server 210 communicate with each other to determine if the device 10 has the most recent key store. If not, the server sends the most recent key store to the device 10. The most recent key store is updated to store the PPID and the application ID.

At block 342, after storing the PPID and application ID, the user agent 200 encrypts the key store and updates the indicator that the key store on the device is the most recent. The indicator can be, for example, a time stamp. The user agent 200 sends a copy of the encrypted key store to the server 210 (block 343) and the server 210 saves the updated key store for the user. The encrypted key store is also stored on the device 10 (block 344).

In an example embodiment, the device 10 sends a copy of the username and PPID to the application's server (block 346). The application's server may use this information to authenticate a user trying to access the application.

The username and PPID are also sent to the API (block 347), which forwards it to the application 208 (block 348). After the application receives the username and PPID (block 350), the application 208 uses this credential information to access the application.

It can be appreciated that the user may not be aware of the PPID and that the user does not need to remember the PPID. The PPID has been automatically created and stored by the user agent. It is also automatically retrieved by the PPID. This reduces the burden on a user to create and remember a password.

Turning to FIG. 8(*b*), example computer executable instructions are provided for signing into an application or accessing an application using the PPID. After receiving the single sign-on username and password (block 354), the application 208 receives an input to attempt to access the application 208 (block 356). The API 206 retrieves the application ID (block 358) and sends the request for the PPID to the user agent 200 (block 360). The request includes the application ID. After receiving the request for the PPID and the corresponding application ID (block 362), the device 10 determines whether or not it is in communication with the server 210 (block 364). If so, the device 10 and the server 210 determine if there is a more recent key store on the server (block 370). If so, the more recent key store is retrieved from the server 210 and sent to the device 10 (block 372). If not, the key store on the device 10 is retrieved (block 366). Similarly, if it is detected that the device 10 is not in communication with the server 210, the process continues to block 366.

At block 368, the key store is decrypted using a shared secret 378, which is computed using a hardware key 376 and a public key 374 of the server 210. The user agent 200 then determines if the application ID exists in the key store (block 380). If not, then an "access denied" message is displayed by the application 208 (block 396). If so, then the user agent 200 retrieves the PPID associated with the application ID (block 382). The key store is then encrypted (block 384). If any changes were made, the user agent 200 may send the encrypted key store to the server 210 for storage on the server 210 (block 386).

The user agent 200 sends the PPID to the application 208 through the API 206 (blocks 388, 390 and 392). After receiving the PPID, the application 208 uses the PPID to access the application (block 394).

Figure 9:
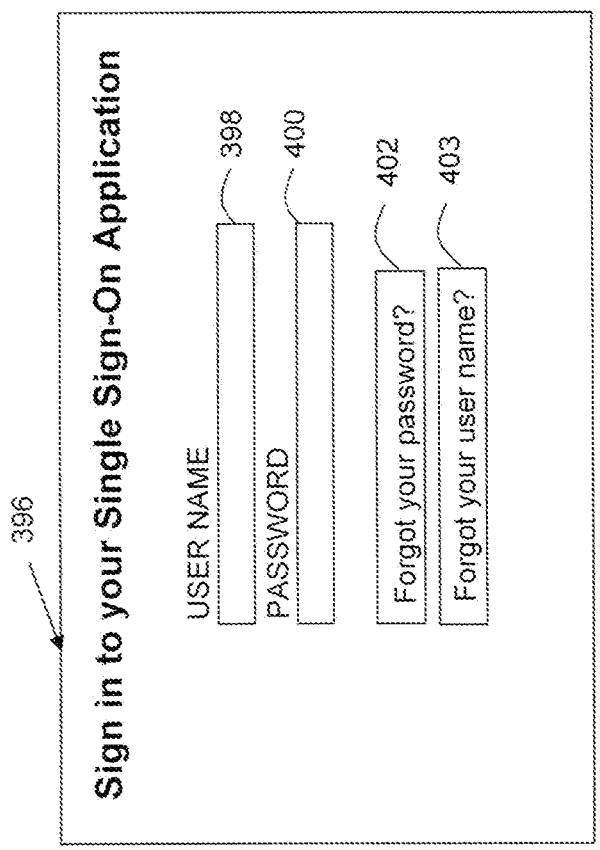

Turning to FIG. 9, an example GUI 396 is shown to facilitate a user to sign into the single sign-on application (e.g. corresponding to blocks 240, 270, 314, 354). It includes a field 398 to receive a username and a field 400 to receive a password. There may also be a button 402 that can be selected should the user forget their password. There may also be a button 403 that can be selected should the user forget their username.

FIG. 10(*a*) shows an example GUI 404 for creating access credentials for an application. Such a GUI 404 can be shown, for example, when performing the operations at block 242 or 316. The GUI 404 includes a text field to receive a username for the application. There may also be an option for the user to create their own password 408 and an option to use an automatically generated password 410.

If the user selects option 408, turning to FIG. 10(*b*), a GUI 412 is shown providing a text field 414 for the user to enter in their password. In another example embodiment, the user may need to enter in the same password twice to confirm the password. If the user selects option 410, turning to FIG. 10(*c*), a GUI 416 is shown displaying a message 418 that the auto-generated password has been created and stored.

In an example general embodiment, a method for managing credential information, is provided. The credential information is for accessing a software application on a computing device. The method comprises: the computing device obtaining the credential information; an application program interface (API), associated with the software application, sending the credential information and an application identification (ID) of the software application to an user agent, the user agent on the computing device; the user agent decrypting a key store; the user agent storing the credential information in association with the application ID in the key store; the user agent associating with the key store a time stamp of when the credential information and the application ID were stored; the user agent encrypting the key store; and the user agent sending a copy of the encrypted key store, the time stamp to a server.

In another example aspect, the user agent decrypts the key store using a shared secret, the shared secret derived from a hardware key of the computing device and a public key of the server. In another example aspect, the method further comprises accessing the software application by: the API sending a request to the user agent for the credential information, the request including the application ID; the user agent determining if the computing device is in communication with the server, and if not, the user agent decrypting the key store; the user agent determining if the application ID exists in the key store and, if so, retrieving the credential information associated with the application ID; the user agent encrypting the key store; and the user agent sending the credential information, through the API, to the software application to provide access to the software application. In another example aspect, if the user agent determines the computing device is in communication with the server, the method further comprises: the user agent determining if a more recent key store is available from the server based on the time stamp of the key store; if the more recent key store is available, the user agent retrieving from the sever the more recent key store; the user agent decrypting the more recent key store; the user agent determining if the application ID exists in the more recent key store and, if so, retrieving the credential information associated with the application ID; the user agent encrypting the more recent key store; and the user agent sending the credential information, through the API, to the software application to provide access to the software application. In another example aspect, the credential information is a username and a password received through a GUI. In another example aspect, the credential information comprises a username. In another example aspect, the method further comprises: the user agent creating a personal private identification (PPID) by combining the application ID and a user identification; and the user agent incorporating the PPID into the credential information. In another example aspect, the PPID is created by computing a hash value of a combination of the application ID and the user identification, and truncating the hash value to a predetermined number of bits. In another example aspect, the method further includes activating the user agent after signing into an operating system on the computing device. In another example aspect, the method further includes activating the user agent after signing into the user agent. In another example aspect, at least one of a single sign-on username and a single sign-on password are used to activate the user agent.

The steps or operations in the flow charts described herein are just for example. There may be many variations to these steps or operations without departing from the spirit of the invention or inventions. For instance, the steps may be performed in a differing order, or steps may be added, deleted, or modified.

Although the above principles have been described with reference to certain specific embodiments, various modifications thereof will be apparent to those skilled in the art without departing from the scope of the claims appended hereto.

The invention claimed is:

1. A method of managing credential information, the credential information for accessing a software application on a computing device, the method performed by the computing device comprising an application program interface (API) associated with the software application and a user agent in communication with the API, the method comprising:
   obtaining the credential information using the computing device;
   sending the credential information and an application identification (ID) of the software application from the API to the user agent;
   storing the credential information in association with the application ID in a key store using the user agent;
   encrypting the key store; and
   accessing the software application by at least:
      sending a request from the API to the user agent for the credential information, the request including the application ID;
      decrypting the key store;
      retrieving the credential information associated with the application ID when the application ID exists in the key store;
      encrypting the key store; and
      sending the credential information from the user agent, through the API, to the software application to provide access to the software application.

2. The method of claim 1 wherein, before storing the credential information in the key store, the user agent decrypts the key store using a shared secret, the shared secret being derived from a key of the computing device and a public key of a server.

3. The method of claim 1 further comprising:
   associating with the key store a time stamp of when the credential information and the application ID were stored using the user agent;
   sending the time stamp with the copy of the encrypted key store to a server; and
   when accessing the software application when the computing device is in communication with the server, the method further comprising:
      determining if a more recent key store is available from the server based on the time stamp of the key store;
      if the more recent key store is available, the user agent retrieving from the sever the more recent key store;
      decrypting the more recent key store;
      determining if the application ID exists in the more recent key store and, if so, retrieving the credential information associated with the application ID using the user agent;
      encrypting the more recent key store; and
      sending the credential information from the user agent, through the API, to the software application to provide access to the software application.

4. The method of claim 1 wherein the credential information comprises a username and a password received through a graphical user interface (GUI).

5. The method of claim 1 wherein the credential information comprises a username.

6. The method of claim 5 further comprising:
   creating a personal private identification (PPID) by combining the application ID and a user identification; and
   incorporating the PPID into the credential information.

7. The method of claim 6 wherein the PPID is created by computing a hash value of a combination of the application ID and the user identification, and truncating the hash value to a predetermined number of bits.

8. The method of claim 1 further comprising activating the user agent after signing into an operating system on the computing device.

9. The method of claim 1 further comprising activating the user agent after signing into the user agent.

10. A non-transitory computer readable medium comprising computer executable instructions for managing credential information, the credential information for accessing a software application on a computing device, the computer executable instructions performed by the computing device comprising an application program interface (API) associated with the software application and a user agent in communication with the API, the computer executable instructions comprising:

obtaining the credential information using the computing device;

sending the credential information and an application identification (ID) of the software application from the API to the user agent;

storing the credential information in association with the application ID in a key store using the user agent;

encrypting the key store; and accessing the software application by at least:
- sending a request from the API to the user went for the credential information the request including the application ID;
- decrypting the key store;
- retrieving the credential information associated with the application ID when the application ID exists in the key store,
- encrypting the key store; and
- sending the credential information from the user agent, through the API, to the software application to provide access to the software application.

11. The non-transitory computer readable medium of claim 10 wherein, before storing the credential information in the key store, the user agent decrypts the key store using a shared secret, the shared secret being derived from a key of the computing device and a public key of a server.

12. The non-transitory computer readable medium of claim 10, wherein the computer executable instructions further comprise:
- associating with the key store a time stamp of when the credential information and the application ID were stored using the user agent;
- sending the time stamp with the copy of the encrypted key store to a server; and
- when accessing the software application when the computing device is communication with server, the computer executable instructions further comprise:
- determining if a more recent key store is available from the server based on the time stamp of the key store;
- if the more recent key store is available, the user agent retrieving from the sever the more recent key store;
- decrypting the more recent key store;
- determining if the application ID exists in the more recent key store and, if so, retrieving the credential information associated with the application ID using the user agent;
- encrypting the more recent key store; and
- sending the credential information from the user agent, through the API, to the software application to provide access to the software application.

13. The non-transitory computer readable medium of claim 10 wherein the credential information comprises a username and a password received through a graphical user interface (GUI).

14. The non-transitory computer readable medium of claim 10 wherein the credential information comprises a username.

15. The non-transitory computer readable medium of claim 14 wherein the computer executable instructions further comprise:
- creating a personal private identification (PPID) by combining the application ID and a user identification; and
- incorporating the PPID into the credential information.

16. The non-transitory computer readable medium of claim 15 wherein the PPID is created by computing a hash value of a combination of the application ID and the user identification, and truncating the hash value to a predetermined number of bits.

17. The non-transitory computer readable medium of claim 10 wherein the computer executable instructions further comprise activating the user aaent after signing into an operating system on the computing device.

18. The non-transitory computer readable medium of claim 10 wherein the computer executable instructions further comprise activating the user agent after signing into the user agent.

* * * * *

UNITED STATES PATENT AND TRADEMARK OFFICE
CERTIFICATE OF CORRECTION

| | |
|---|---|
| PATENT NO. | : 8,689,299 B2 |
| APPLICATION NO. | : 13/334890 |
| DATED | : April 1, 2014 |
| INVENTOR(S) | : Brian Everett McBride et al. |

Page 1 of 1

It is certified that error appears in the above-identified patent and that said Letters Patent is hereby corrected as shown below:

In the Claims

Claim 10 (column 17, line 10): Replace "user went" with -- user agent --

Signed and Sealed this
Twenty-third Day of September, 2014

Michelle K. Lee
*Deputy Director of the United States Patent and Trademark Office*